United States Patent
Nakano et al.

(10) Patent No.: US 8,390,727 B2
(45) Date of Patent: Mar. 5, 2013

(54) OPTICAL UNIT, IMAGING UNIT, IMAGING BODY, AND IMAGING DEVICE HAVING THE IMAGING BODY

(75) Inventors: Toshifumi Nakano, Sagamihara (JP); Tatsuya Suzuki, Setagaya-ku (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 128 days.

(21) Appl. No.: 12/844,984

(22) Filed: Jul. 28, 2010

(65) Prior Publication Data
US 2010/0283886 A1 Nov. 11, 2010

Related U.S. Application Data

(63) Continuation of application No. PCT/JP2009/050859, filed on Jan. 21, 2009.

(30) Foreign Application Priority Data

Jan. 28, 2008 (JP) ................... 2008-016337
Feb. 14, 2008 (JP) ................... 2008-033186

(51) Int. Cl.
 H04N 5/225 (2006.01)
 G03B 9/08 (2006.01)
(52) U.S. Cl. ........................ 348/341; 396/452
(58) Field of Classification Search .............. 348/341, 348/E05.024
See application file for complete search history.

(56) References Cited

U.S. PATENT DOCUMENTS

| | | | |
|---|---|---|---|
| 1,127,809 A | 2/1915 | Denk | |
| 1,633,373 A | 6/1927 | Cregier | |
| 2,569,799 A | 10/1951 | Carroll et al. | |
| 2,596,799 A | 5/1952 | Tillyer et al. | |
| 3,914,034 A | 10/1975 | Komine | |
| 4,730,199 A * | 3/1988 | Ikemori et al. | 396/384 |
| 4,854,679 A | 8/1989 | Tsuji | |
| 4,994,842 A | 2/1991 | Itoh et al. | |
| 5,208,624 A | 5/1993 | MacKay | |
| 5,319,405 A * | 6/1994 | Ikemori | 396/353 |
| 5,483,284 A | 1/1996 | Ishiguro | |
| 5,940,642 A | 8/1999 | Ishiguro | |
| 7,667,897 B2 | 2/2010 | Seo | |
| 7,787,193 B2 * | 8/2010 | Sakamoto et al. | 359/696 |
| 2007/0019098 A1 * | 1/2007 | Senba et al. | 348/333.08 |
| 2007/0230935 A1 * | 10/2007 | Yahagi | 396/111 |
| 2010/0283886 A1 | 11/2010 | Nakano et al. | |
| 2010/0284684 A1 | 11/2010 | Nakano et al. | |
| 2010/0309363 A1 | 12/2010 | Nakano et al. | |

FOREIGN PATENT DOCUMENTS

| | | |
|---|---|---|
| JP | 4-275534 A | 10/1992 |
| JP | 8-262564 A | 10/1996 |
| JP | 10-339907 A | 12/1998 |
| JP | 11-305315 A | 11/1999 |
| JP | 2000-013654 A | 1/2000 |
| JP | 2000-059655 A | 2/2000 |
| JP | 2000-333060 A | 11/2000 |
| JP | 2002-185845 A | 6/2002 |
| JP | 2007-019868 A | 1/2007 |

* cited by examiner

Primary Examiner — Chieh M Fan
Assistant Examiner — Fayez Bhuiyan
(74) Attorney, Agent, or Firm — Dickstein Shapiro LLP

(57) ABSTRACT

An optical unit (1) includes a first attachment/detachment portion (2) to which an imaging optical system (31) is detachably attached, an optical path division means (3), a finder optical system (6), and a second attachment/detachment portion (4). An imaging unit includes a third attachment/detachment portion (11) disposed at a position corresponding to the second attachment/detachment portion (4) and an imaging element (12, 12'). An imaging body (20, 20') includes the optical unit (1) and imaging unit (10, 10') which are detachably attached to each other through the second and third attachment/detachment portions (4) and (11).

2 Claims, 10 Drawing Sheets

OPTICAL UNIT, IMAGING UNIT, IMAGING BODY, AND IMAGING DEVICE HAVING THE IMAGING BODY

BACKGROUND OF THE INVENTION AND RELATED ART

The present invention relates to an optical unit to which an imaging optical system is detachably attached, an imaging unit, an imaging body, and an imaging device.

There is known a camera capable of exchanging an imaging element with another imaging element of a different size according to the purpose (refer to Patent Document 1). This camera has a horizontally-long box-like camera body and a photographing lens for silver salt single-lens reflex camera. As the camera body, a camera body for silver salt single-lens reflex camera is used without modification. As a back lid, one for silver-salt camera and one for digital camera are prepared. When the back lid for digital camera is attached to the camera body, this camera can be used as a digital camera. Further, this camera has a configuration allowing exchange of a CCD substrate and thus different types of digital cameras can be realized by one camera body.

Patent Document 1: JP-A-2000-59655

SUMMARY OF THE INVENTION

An optical unit according to the present invention includes: a first attachment/detachment portion to which an imaging optical system is detachably attached; an optical path division means; a finder optical system; and a second attachment/detachment portion.

An imaging unit according to the present invention is an imaging unit detachably attached to the optical unit through the second attachment/detachment portion, the imaging unit including: a third attachment/detachment portion disposed at a position corresponding to the second attachment/detachment portion; and an imaging element.

The imaging unit further includes: a conversion optical system, wherein the conversion optical system is disposed between the third attachment/detachment portion and the imaging element.

An imaging body according to the present invention includes the optical unit and the imaging unit according to the present invention, wherein the optical unit and the imaging unit are connected to each other through the second and third attachment/detachment portions.

An imaging device according to the present invention includes the imaging body and the imaging optical system.

Further, an optical unit according to another aspect of the present invention includes: a first attachment/detachment portion; an optical path division means; and an imaging optical system, wherein the imaging optical system is disposed opposite to the first attachment/detachment portion with respect to the optical path division means.

Further, an imaging body according to another aspect of the present invention includes: a second attachment/detachment portion; an imaging element; a conversion optical system; and a finder optical system, wherein the second attachment/detachment portion is disposed opposite to the imaging element with respect to the conversion optical system.

Further, an imaging device according to another aspect of the present invention includes: the optical unit and the imaging body according to another aspect of the present invention, wherein the optical unit and the imaging body are connected to each other through the first and second attachment/detachment portions.

BRIEF DESCRIPTION OF THE DRAWINGS

FIGS. 5A and 5B are views each illustrating another example of the imaging body, wherein FIG. 5A illustrates a case where an optical path division means 3 is located at a first position, and FIG. 5B illustrates a case where the optical path division means 3 is located at a second position;

DETAILED DESCRIPTION OF PREFERRED EMBODIMENT

Figure 1:
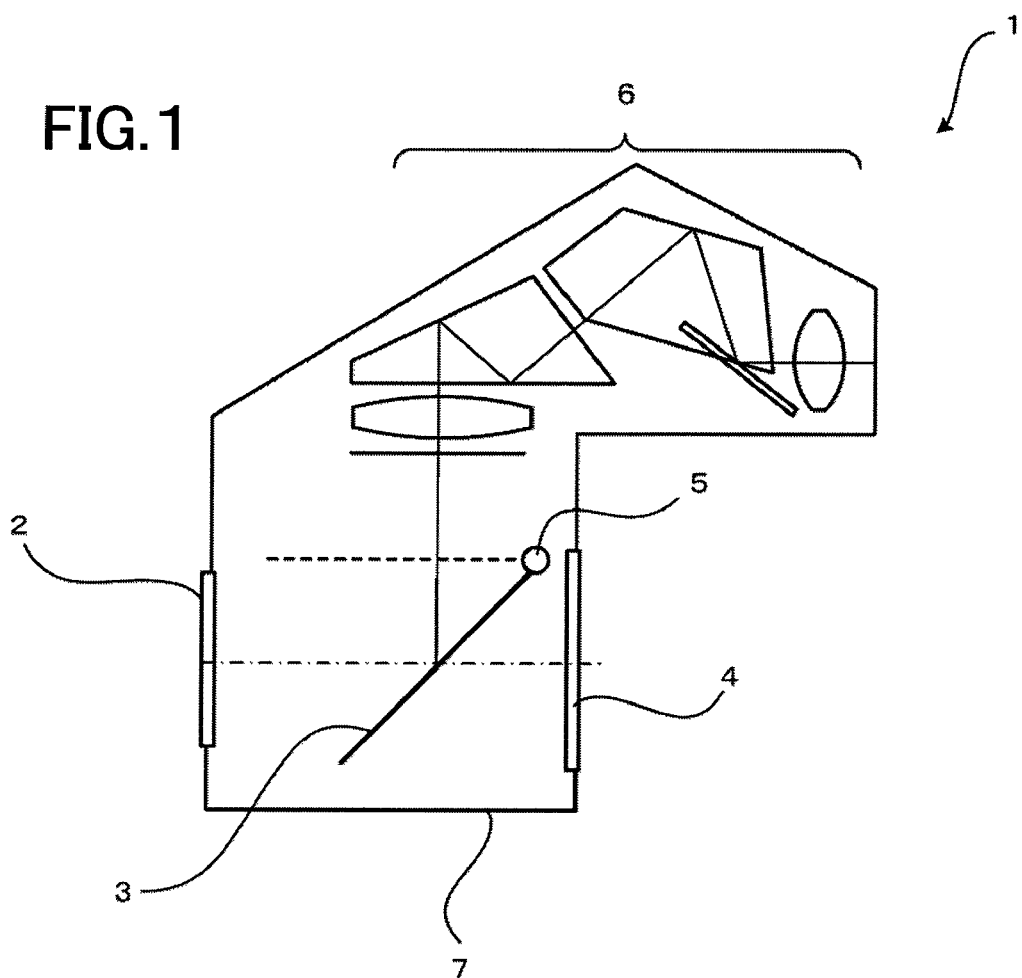
FIG. 1 is a view illustrating an optical unit according to a first embodiment of the present invention.

Embodiments of the present invention will be described. A first embodiment is an optical unit. FIG. 1 illustrates an optical unit 1 according to the present embodiment. As illustrated in FIG. 1, the optical unit 1 includes a first attachment/detachment portion 2, an optical path division means 3, a finder optical system 6, and a second attachment/detachment portion 4.

The optical path division means 3 is, e.g., a mirror (quick return mirror). The mirror can be moved between first and second positions by a first moving mechanism 5. The first position is indicated by a solid line. The first position is located between the first attachment/detachment portion 2 and the second attachment/detachment portion 4. The second position is indicated by a broken line. The second position is a position near the finder optical system 6 which is obtained by rotating the optical path division means 3 located at the first position by 45 degrees.

In the optical unit 1 according to the present embodiment, the second attachment/detachment portion 4 is disposed opposite to the first attachment/detachment portion 2 with respect to the first position. That is, the position at which the second attachment/detachment portion 4 is disposed crosses the optical axis of an imaging optical system attached to the first attachment/detachment portion 2. The first and second attachment/detachment portions 2 and 4 are each, e.g., a bayonet ring and a bayonet. An imaging optical system can detachably be attached to the optical unit 1 through the first attachment/detachment portion 2. Further, an imaging unit to be described later can detachably be attached to the optical unit 1 through the second attachment/detachment portion 4. A bottom surface portion 7 contacts the upper surface of a protruding portion of the imaging unit attached to the second attachment/detachment portion 4.

As described above, the optical unit according to the present embodiment includes the first attachment/detachment portion 2 and thus can connect with various types of imaging optical systems. The optical unit further includes the second attachment/detachment portion 4 and thus can connect with various types of imaging units, i.e., those having imaging elements different in size.

Figure 2:
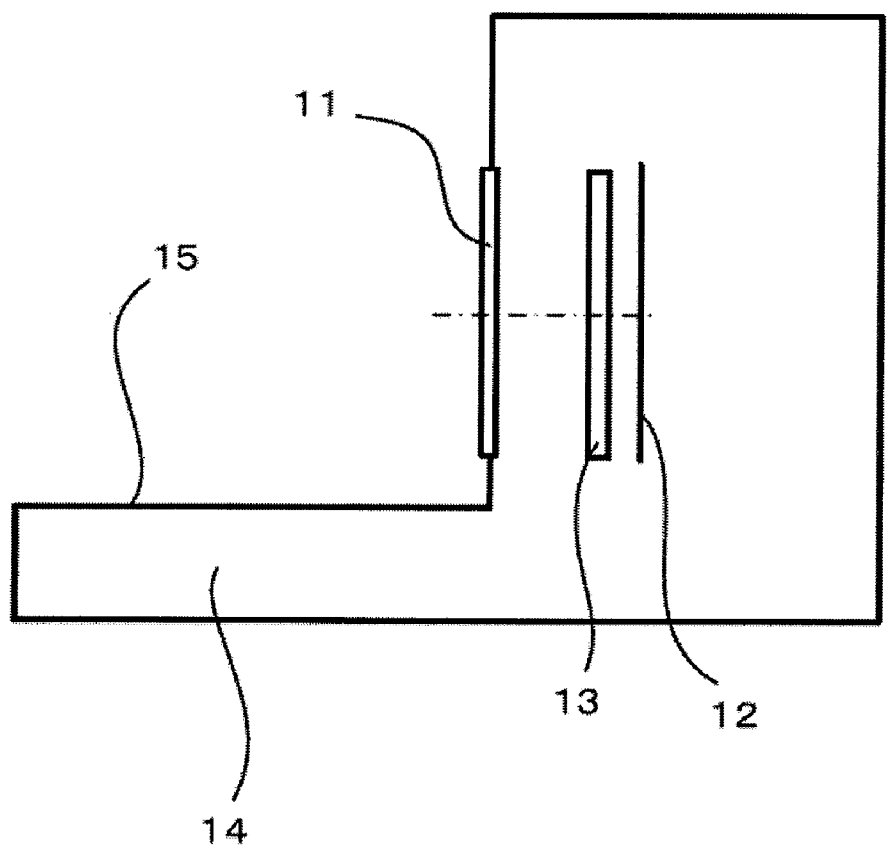
FIG. 2 is an imaging unit according to a second embodiment of the present invention.

A second embodiment will next be described. The second embodiment is an imaging unit. FIG. 2 illustrates an imaging unit 10 according to the present embodiment. The imaging unit 10 includes a third attachment/detachment portion 11 and an imaging element 12. Further, a filter 13 is disposed in front of the imaging unit 12. The third attachment/detachment portion 11 is provided at a position corresponding to the second attachment/detachment portion 4 of the optical unit 1 illustrated in FIG. 1. That is, the imaging unit 10 is connected to the optical unit 1 through the third attachment/detachment portion 11 and the second attachment/detachment portion 4 of FIG. 1. The imaging unit 10 has a protruding portion 14 protruding in the front direction of the third attachment/detachment portion 11. When the imaging unit 10 is attached to the optical unit 1, an upper surface 15 of the protruding portion 14 contacts the bottom surface portion 7 of the optical unit 1.

Figure 3:
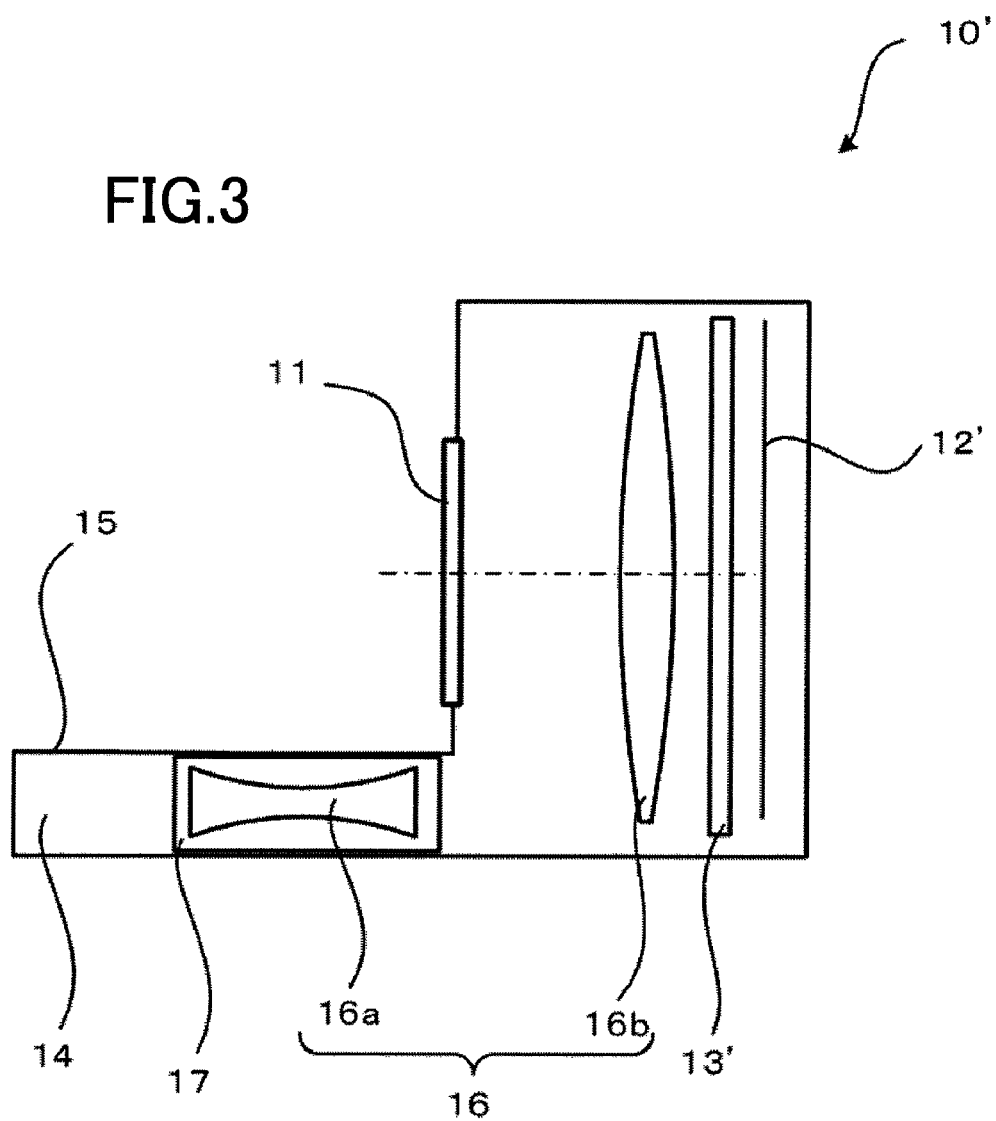
FIG. 3 is another example of the imaging unit.

FIG. 3 illustrates another imaging unit 10'. The imaging unit 10' includes the third attachment/detachment portion 11, an imaging element 12' and a conversion optical system 16. The conversion optical system 16 is disposed between the third attachment/detachment portion 11 and the imaging element 12'. The conversion optical system 16 is constituted by a front side lens system 16a and a rear side lens system 16b. The front side lens system 16a is disposed in the protruding portion 14 of the imaging unit 10'. The rear side lens system 16b is disposed between the third attachment/detachment portion 11 and the imaging unit 12'.

The imaging unit 10' includes a second moving mechanism 17. The second moving mechanism 17 is provided for moving the front side lens system 16a. There may be a case where the optical path division means 3 is located at the first position (position indicated by the solid line of FIG. 1) when the imaging unit 10' is connected to the optical unit 1. In the case where the optical path division means 3 is located at the first position, it is necessary to prevent the front side lens system 16a from colliding with the optical path division means 3. Thus, in the case where the optical path division means 3 is located in the first position, the front side lens system 16a stays in the protruding portion 14.

When the optical path division means 3 is moved to the second position, the front side lens system 16a is moved to the first position by means of the second moving mechanism 17. The position of the front side lens system 16a at this time is located in front of the third attachment/detachment portion 11 and on the optical axis of the rear side lens system 16b. As a result, a subject image can be formed on the imaging element 12' through the conversion optical system 16. When the front side lens system 16a is moved to the protruding portion 14, a translation mechanism, a rotation mechanism or a combination thereof may be used.

The imaging unit 10' has the same third attachment/detachment portion 11 as the imaging unit 10 and is thus connected to the optical unit 1 through the third attachment/detachment portion 11 and the second attachment/detachment portion 4 of FIG. 1. That is, the both the imaging units 10 and 10' are configured to be connectable to the optical unit 1.

The imaging units 10 and 10' differ from each other in the size of the imaging element. In the present embodiment, the size of the imaging element 12 is smaller than that of the imaging element 12'. Thus, exchanging the imaging unit to be attached to the optical unit 1 between the imaging units 10 and 10' allows the use of imaging elements different in the size of a light receiving section.

A third embodiment will next be described. The third embodiment is an imaging body. The imaging body includes the abovementioned optical unit 1 and abovementioned imaging unit 10 or 10'. The optical unit 1 and imaging unit 10 or 10' are connected to the imaging body though the second attachment/detachment portion 4 and third attachment/detachment portion 11.

Figure 4:
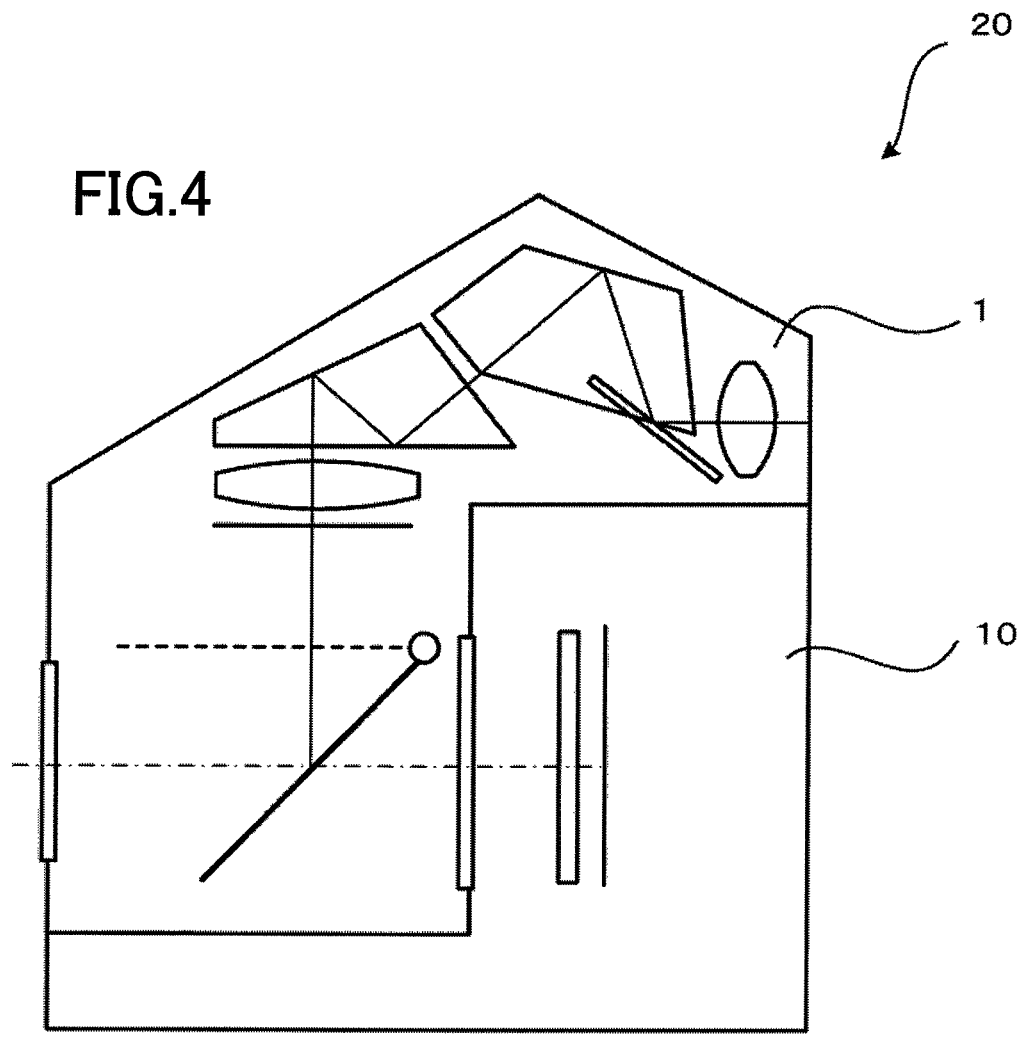
FIG. 4 is a view illustrating an imaging body according to a third embodiment of the present invention.
Figure 5A:
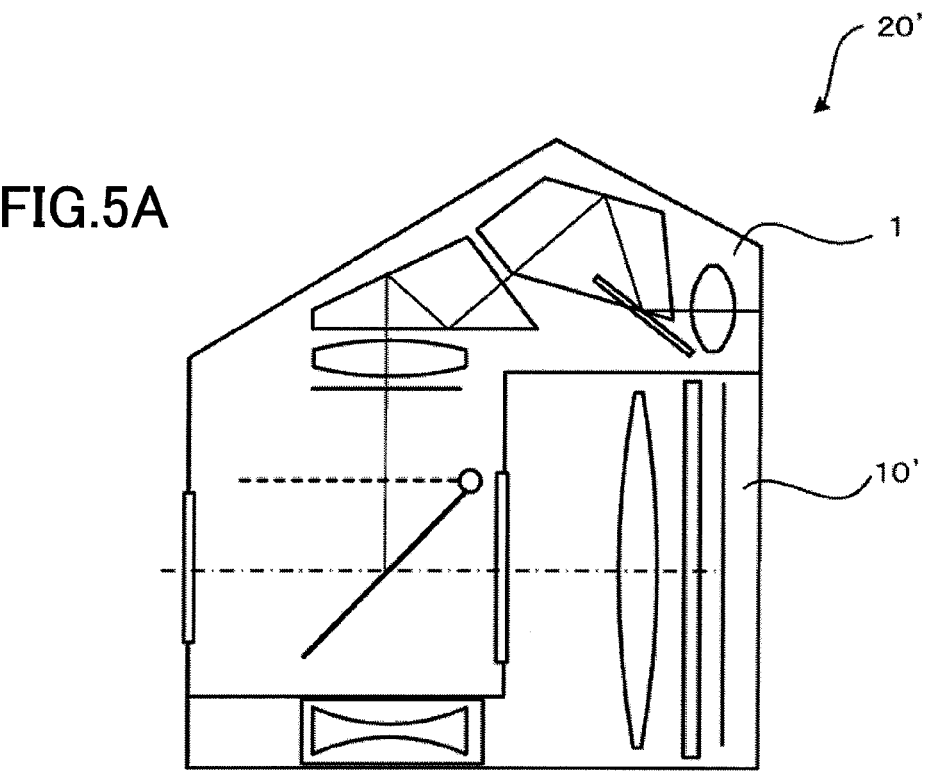
Figure 5B:
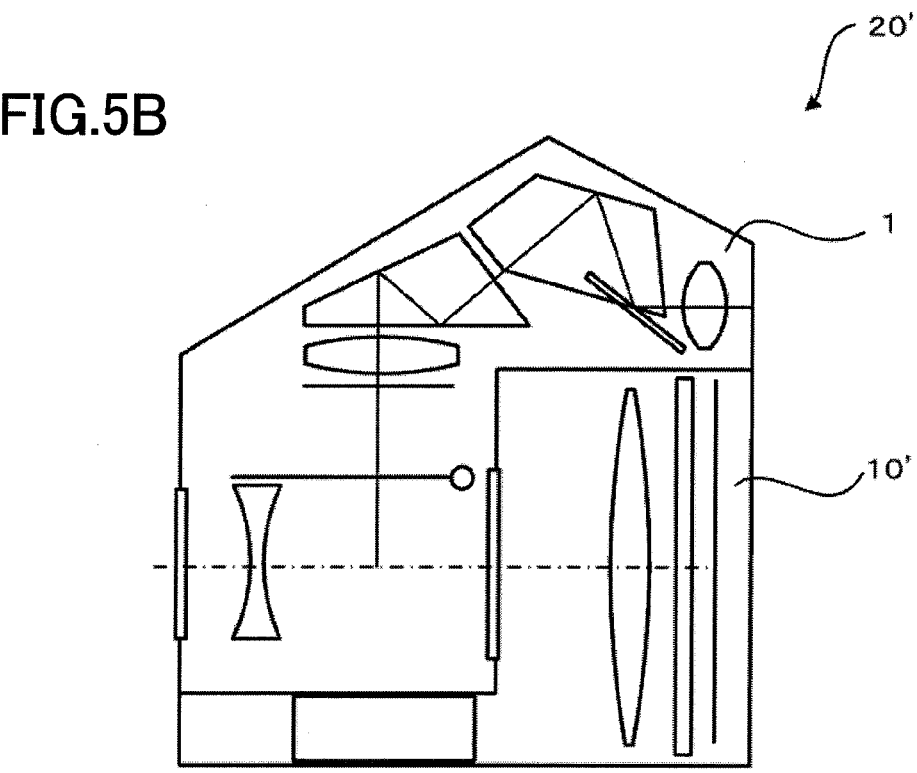

FIG. 4 illustrates an example of an imaging body 20. The imaging body 20 includes the optical unit 1 of FIG. 1 and imaging unit 10 of FIG. 2 attached to the optical unit 1. FIGS. 5A and 5B illustrate an example of an imaging body 20'. The imaging body 20' includes the optical unit 1 of FIG. 1 and the imaging unit 10' of FIG. 3 attached to the optical unit 1. FIG. 5A illustrates a case where the optical path division means 3 is located at the first position. In this case, the front side lens system 16a is located in the protruding portion 14. FIG. 5B illustrates a case where the optical path division means 3 is located at the second position. In this case, the front side lens system 16a is located at the first position, i.e., located on the optical axis of the rear side lens system 16b.

An imaging optical system can be attached to the optical unit 1 through the first attachment/detachment portion 2. The size of an image to be formed is determined depending on the imaging optical system used. In the present embodiment, the size of an image to be formed corresponds to the size of the light receiving section of the imaging element 12. Thus, in the case where the imaging unit 10 is exchanged for the imaging unit 10' without changing the imaging optical system, the size of an image becomes smaller relative to the size of the light receiving section of the imaging element 12'. In order to cope with this inconvenience, the conversion optical system 16 is provided in the imaging unit 10'. This allows formation of an image corresponding to the size of the light receiving section of the imaging element 12'.

Figure 6:
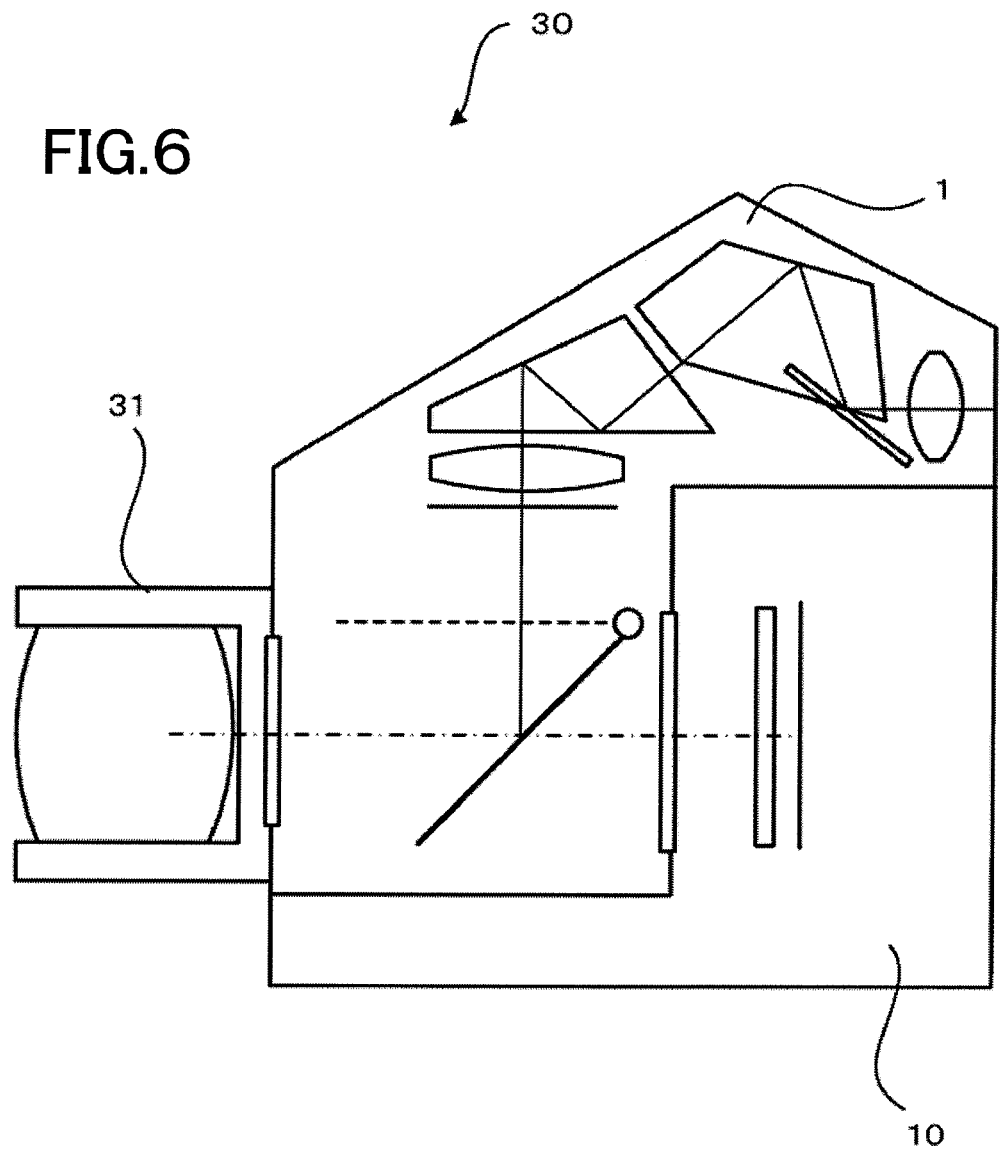
FIG. 6 is a view illustrating an imaging device according to a fourth embodiment of the present invention.

A fourth embodiment will next be described. The fourth embodiment is an imaging device. An imaging device 30 includes the abovementioned imaging body 20 or 20' and an imaging optical system 31. FIG. 6 illustrates the imaging device 30. FIG. 6 illustrates a case where the imaging optical system 31 is attached to the imaging body 20 of FIG. 4. Alternatively, the imaging optical system 31 may be attached to the imaging body 20' of FIGS. 5A and 5B.

Figure 7:
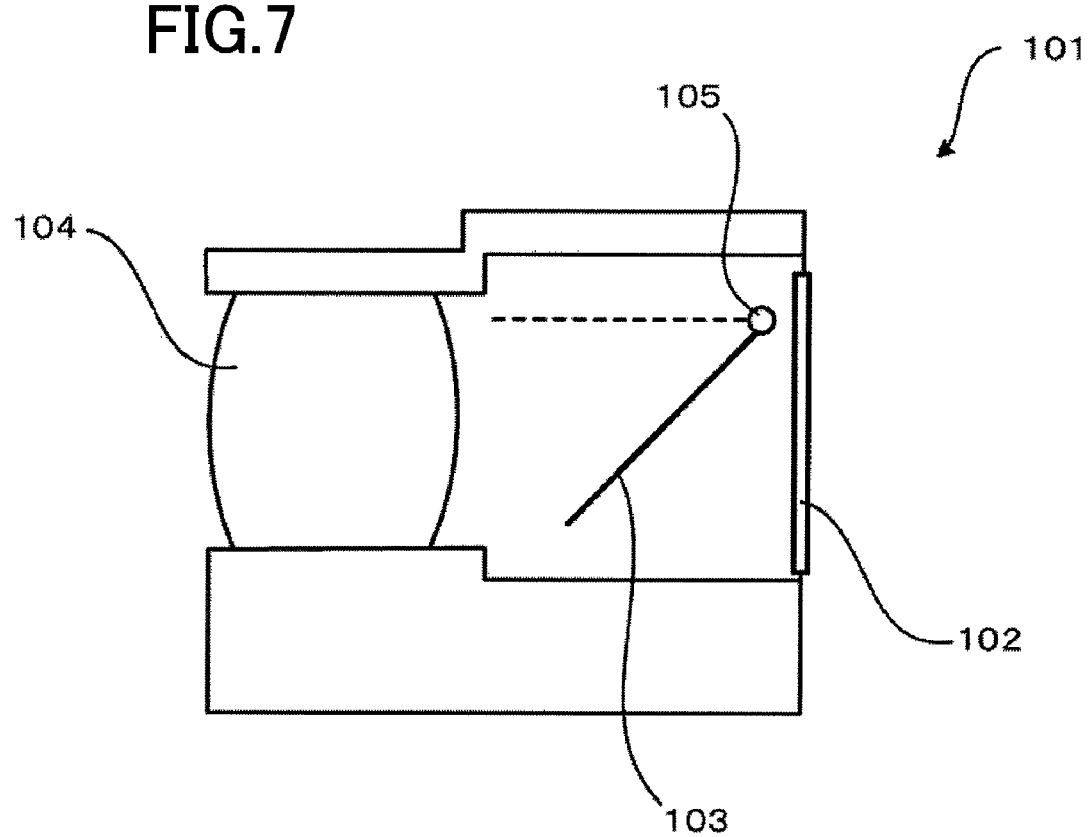
FIG. 7 is a view illustrating an optical unit according to a fifth embodiment of the present invention.

Other embodiments of the present invention will next be described. A fifth embodiment is an optical unit. FIG. 7 illustrates an optical unit 101 according to the present embodiment. As illustrated in FIG. 7, the optical unit 101 includes a first attachment/detachment portion 102, an optical path division means 103, and an imaging optical system 104.

The optical path division means 103 is e.g., a mirror (quick return mirror). The mirror can be moved between first and second positions by a first moving mechanism 105. The first position is indicated by a solid line. The first position is located between the first attachment/detachment portion 102 and the imaging optical system 104. The second position is indicated by a broken line. The second position is a position obtained by rotating the optical path division means 103 located at the first position by 45 degrees.

In the optical unit 101 of the present embodiment, the imaging optical system 104 is disposed opposite to the first attachment/detachment portion 102 with respect to the first position. The position at which the first attachment/detachment portion 102 is disposed crosses the optical axis of the imaging optical system 104. The first attachment/detachment portion 102 is, e.g., a bayonet. An imaging body to be described later can detachably be attached to the optical unit 101 through the first attachment/detachment portion 102.

As described above, the optical unit according to the present embodiment includes the first attachment/detachment portion 102 and thus can connect with various types of imaging bodies, i.e., those having imaging elements different in size.

Figure 8:
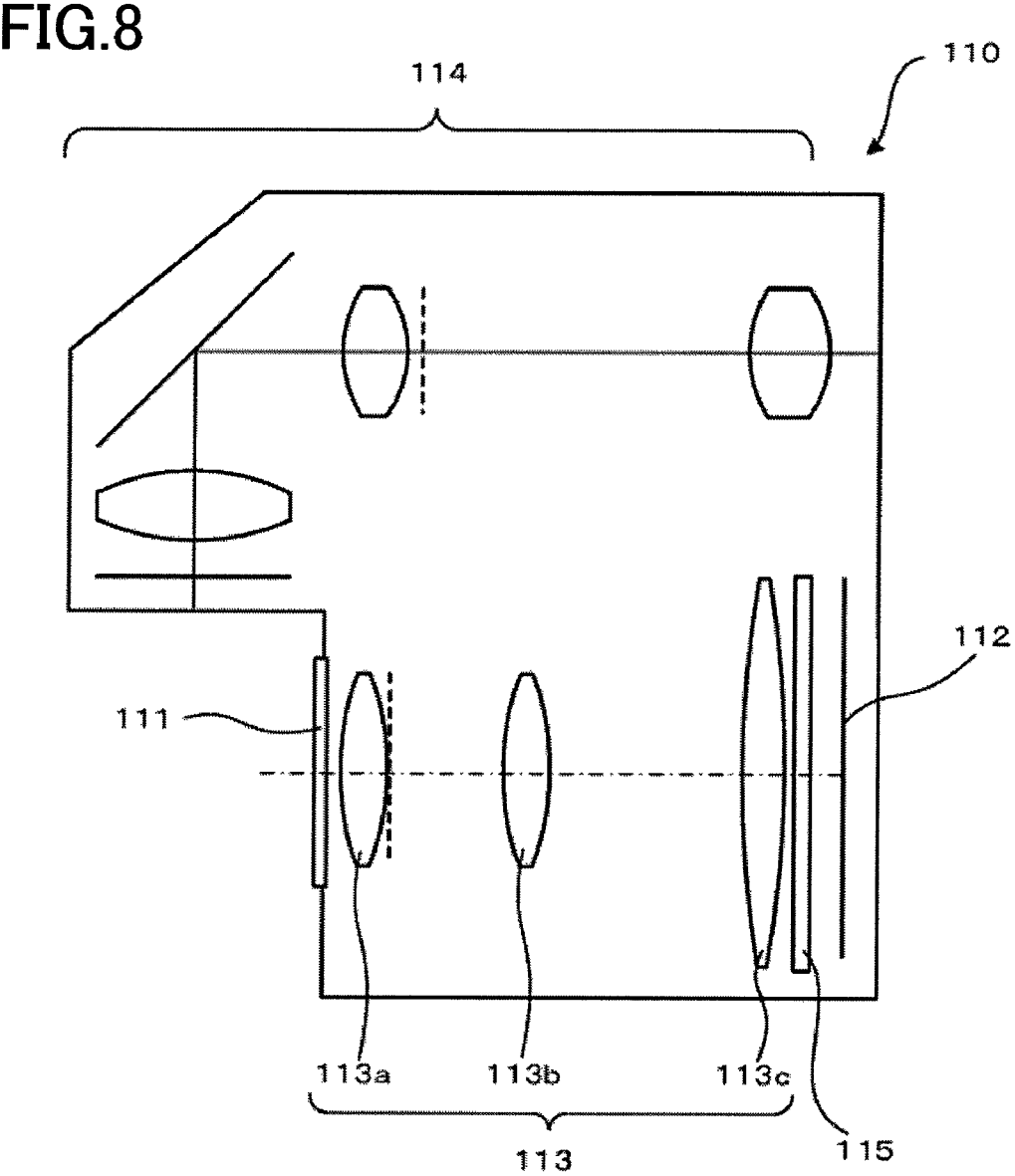
FIG. 8 is a view illustrating an imaging body according to a sixth embodiment of the present invention.

A sixth embodiment will next be described. The sixth embodiment is an imaging body. FIG. 8 illustrates an imaging body 110 according to the present embodiment. The imaging body 110 includes a second attachment/detachment portion 111, an imaging element 112, a conversion optical system 113, and a finder optical system 114. Further, a filter 115 is disposed in front of the imaging element 112.

The second attachment/detachment portion 111 is disposed at a position corresponding to the first attachment/detachment portion 102 of the optical unit 101 of FIG. 7. The second attachment/detachment portion 111 is, e.g., a bayonet. The abovementioned optical unit 101 can detachably be attached to the imaging body 110 through the second attachment/detachment portion 111.

The imaging body 110 has the conversion optical system 113. The conversion optical system 113 is disposed between the second attachment/detachment portion 111 and the imaging element 112. The conversion optical system 113 is constituted by front side lens systems 113a, 113b and a rear side lens system 113c. The front side lens systems 113a and 113b have a positive refractive power as a whole. The rear side lens system 113c has a positive refractive power as a whole.

The front side lens systems 113a and 113b have a positive refractive power lens 113a disposed near an intermediate image and another positive refractive power lens 113b. The lens 113a, which is disposed near an intermediate image, functions as a field lens.

The conversion optical system 113 is an optical system that forms an intermediate image (primary image). Thus, even when a subject image is enlarged, an aberration-free image can be obtained.

As described above, the imaging body 110 of the present embodiment includes the conversion optical system 113 inside thereof. Thus, a large subject image can be formed on the entire light receiving section by the conversion optical system 113. As a result, an element having a large light receiving section can be used as the imaging element 112. Even in an imaging optical system for an imaging device having a small light receiving section, a large subject image can be formed by means of the conversion optical system 113. This provides an advantage that an existing imaging optical system can be used.

Further, the imaging body 110 of the present embodiment does not include the optical path division means 102 inside thereof, which allows achievement of a reduction in the thickness of the imaging body 110.

Figure 9:
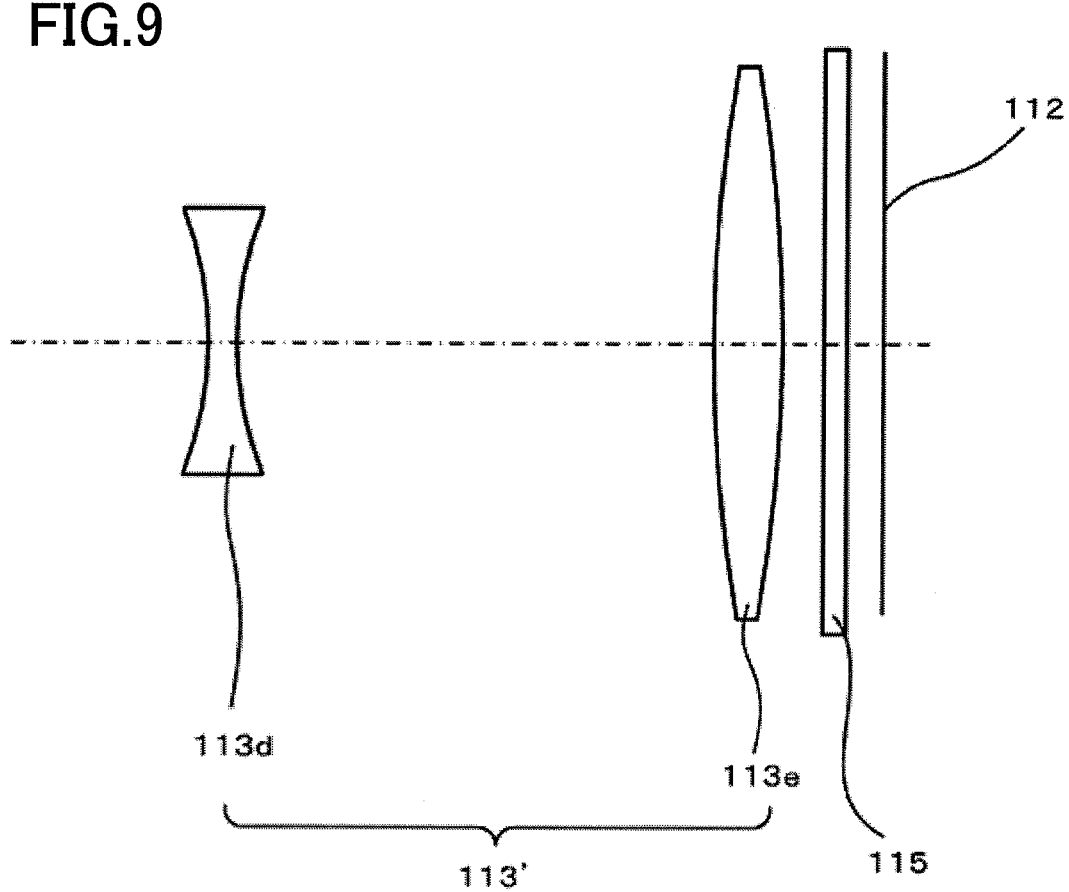
FIG. 9 is a view illustrating another configuration of a conversion optical system.

Another example of the conversion optical system is illustrated in FIG. 9. A conversion optical system 113' is constituted by a front side lens system 113d and a rear side lens system 113e.

The front side lens system 113d has preferably a negative refractive power. On the other hand, the rear side lens system 113e has preferably a positive refractive power. With this configuration, a large subject image can be formed. In FIGS. 8 and 9, the front side lens system and rear side lens system are each constituted by one lens. However, the front side lens system and rear side lens system each may be constituted by a plurality of lenses.

The conversion optical system 113' is an optical system that does not form an intermediate image (primary image). Thus, the thicknesses of the optical system and imaging body 110 can be reduced.

Figure 10:
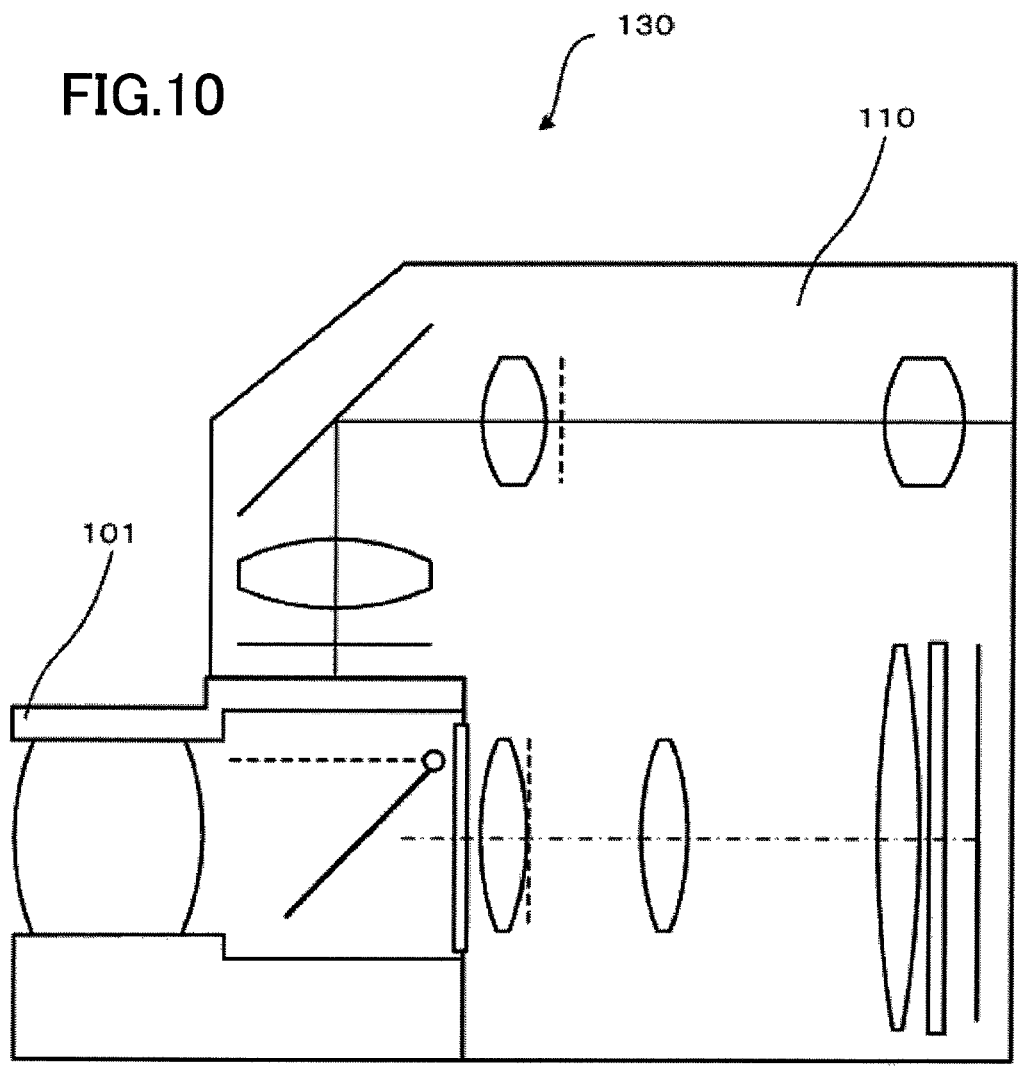
FIG. 10 is a view illustrating an imaging device according to a seventh embodiment of the present invention.

A seventh embodiment will next be described. The seventh embodiment is an imaging device. An imaging device 130 includes the abovementioned imaging unit 101 and imaging body 110. FIG. 10 illustrates the imaging device 130.

According to the above embodiments, an optical unit, an imaging unit, and an imaging body capable of using imaging elements different in the size of a light receiving section and an imaging device including the optical unit, imaging unit, and imaging body can be obtained.

What is claimed is:

1. An imaging unit adapted to detachably attach to an optical unit which comprises a first attachment/detachment portion adapted to detachably attach to an imaging optical system, an optical path division means, a finder optical system, a bottom surface located at a position on the body opposite from the finder optical system, and a second attachment/detachment portion; the imaging unit adapted to detachably attach to the optical unit through the second attachment/detachment portion, the imaging unit comprising:
   a third attachment/detachment portion disposed at a position corresponding to the second attachment/detachment portion; an imaging element; a protruding portion that protrudes forward from the third attachment/detachment portion, the protruding portion having an upper surface that contacts the bottom surface when the imaging unit is attached to the optical unit;
   a conversion optical system having a front side lens system contained in the protruding portion and a rear side lens system disposed between the third attachment/detachment portion; and
   a moving mechanism adapted to move the front side lens system to an optical axis of the rear side lens system.

2. An imaging body, comprising:
   an optical unit comprising:
   a first attachment/detachment portion adapted to detachably attach to an imaging optical system;
   an optical path division means; a finder optical system;
   a bottom surface located at a position on the body opposite from the finder optical system; and
   a second attachment/detachment portion; and
   an imaging unit comprising:
   a third attachment/detachment portion disposed at a position corresponding to the second attachment/detachment portion; an imaging element; a protruding portion that protrudes forward from the third attachment/detachment portion, the protruding portion having an upper surface that contacts the bottom surface when the imaging unit is attached to the optical unit;
   a conversion optical system having a front side lens system contained in the protruding portion and a rear side lens system disposed between the third attachment/detachment portion; and
   a moving mechanism adapted to move the front side lens system to an optical axis of the rear side lens system,
   wherein the optical unit and the imaging unit are connected by the second attachment/detachment portion and the third attachment/detachment portion, the front side lens system is positioned in the protruding portion when the optical path division means is at a first position on an optical path of the rear side lens system, and
   the front side lens system moves to the first position by the moving mechanism when the optical path division means moves to a second position.

* * * * *